United States Patent [19]

Ueda et al.

[11] Patent Number: 5,247,452
[45] Date of Patent: Sep. 21, 1993

[54] CONTROLLER FOR CUTTING MACHINE
[75] Inventors: Tokio Ueda, Iwata; Shigeyoshi Takagi, Fukuroi; Masahiro Takagi, Hamakita, all of Japan
[73] Assignee: NTN Corporation, Osaka, Japan
[21] Appl. No.: 707,734
[22] Filed: May 30, 1991
[30] Foreign Application Priority Data
May 31, 1990 [JP] Japan .................................. 2-143040
Sep. 26, 1990 [JP] Japan .................................. 2-258087
[51] Int. Cl.$^5$ .......................................... G06F 15/46
[52] U.S. Cl. .......................... 364/474.17; 364/551.02
[58] Field of Search ................... 364/474.17, 551.02, 364/474.16, 474.01

[56] References Cited
U.S. PATENT DOCUMENTS

| 4,389,709 | 6/1983 | Knibiehler | 364/551.02 |
| 4,456,960 | 6/1984 | Wakai | 364/474.17 |
| 4,471,444 | 9/1984 | Yee et al. | 364/474.17 |
| 4,564,911 | 1/1986 | Smith et al. | 364/474.17 |
| 4,839,819 | 6/1989 | Begin et al. | 364/483 |

Primary Examiner—Jerry Smith
Assistant Examiner—Paul Gordon
Attorney, Agent, or Firm—Nikaido, Marmelstein, Murray & Oram

[57] ABSTRACT

A controller for a cutting machine has a machining power extracting unit for extracting machining power related to machining from the consumed power of the cutting machine, a detection range setter for setting a detection range for the machining power thus extracted, an integrator for integrating output values of the machining power extracting unit within the detection range thus set, a maximum value detector for detecting the maximum value of the output values of the machining power extracting unit within the detection range, and a judging unit for comparing an input signal with a variable comparative reference value and producing a control signal if the input signal exceeds the comparative reference value. The judging unit has an input which is selectively connectable to the machining power extracting unit, the integrator and the maximum value detector.

5 Claims, 5 Drawing Sheets

CONTROLLER FOR CUTTING MACHINE

FIELD OF THE INVENTION

This invention relates to a controller for a cutting machine and more particularly a device for controlling the feed speed and the timing of tool exchange by detecting any wear or breakage of the cutting tool from the consumed power.

BACKGROUND OF THE INVENTION

The consumed power during cutting depends on whether the cutting tool is brand-new or secondhand and on the way in which it is mounted on the machine. Even with the same tool, the consumed power is greatly influenced by the flow of chips and foreign matter adhering to the cutter edge.

In controlling cutting tools in which the consumed power fluctuates greatly between the individual cutting tools and with the cutting conditions, it is necessary, instead of detecting momentary fluctuations in power, to detect the amount of increase in the consumed power due to wear or breakage with high accuracy and to control the tool based on the detected values.

Heretofore, a controller was proposed in Examined Japanese Patent Publication 57-57223 in which the depth of cut by a grinder is controlled on the basis of the fluctuations in the power consumed by a motor.

In this controller, no-load power of the motor is extracted from the noise-removed consumed power and is compared with damped loaded power. A control signal is given to the grinder when the loaded power exceeds the no-load power.

But this type of controller has a problem in that since the loaded power to be detected is a momentary value during cutting, if this controller is used for the control of such a cutting machine as mentioned above, malfunction may result due to power fluctuation during cutting.

For example, if the damping factor of the detected value is increased to keep the sampling value to be compared and the consumed power from getting too close to each other and thus to prevent malfunction resulting from difference in power among individual cutting tools due to the fact that some are brand-new and some are secondhand, the response time may increase unduly, thus worsening followability. In contrast, if the damping factor is set at such a value that the difference between the sampling value and the consumed power is small in order to improve followability, the controller will malfunction if the consumed power increases even momentarily by the influence of chips or foreign matter adhering to the cutter edge. This makes it impossible to give tool exchange instructions stably.

Also, in the above device, no monitoring period is specified during which the no-loaded power and the power during cutting are compared with each other but monitoring has to be kept on all the time. Thus, if the no-load power changes due to changes in the revolving speed or the direction of rotation of the motor while in operation, the controller may malfunction due to these changes.

SUMMARY OF THE INVENTION

It is an object of this invention to provide a controller which can perform accurate comparison and judgement on the amount of power increase even with respect to the machining power which fluctuates together with the momentary machining fluctuations, which eliminates malfunction due to factors not related to machining and which can control wear of the tool stably.

In accordance with the present invention, there is provided a controller for a cutting machine comprising a machining power extracting device for extracting a machining power related to machining from the consumed power of the cutting machine, a detection range setting device for setting a detection range for the machining power thus extracted, an integration device for integrating the output value of the machining power extracting device within the detection range thus set, a maximum value detecting device for detecting the maximum value of the output values of the machining power extracting device within the detection range, and a judging device for comparing an input signal with a variable comparative reference value and producing a control signal if the input signal exceeds the comparative reference value, the judging device having an input which is selectively connectable to the machining power extracting device, integration device and maximum value detecting means.

In this arrangement, no-load power is subtracted from the consumed power by the machining power extracting device to obtain a machining power. Thus, by setting the detecting range within the machining time during which machining is actually carried out by the cutting tool and integrating the machining power by the integration device within the machining time, momentary power fluctuations are smoothed. Thus, the amount of power change obtained reflects precisely the amount of power change due to wear and chipping of the tool.

Further, by introducing the machining power into the maximum value detecting devices the maximum value of the momentary power fluctuations during cutting can be detected. Thus, even if the machining power fluctuates violently during machining, the controller can respond reliably to any momentary power change.

Further, by connecting the machining power extracting means with the judging device, the machining power which changes during actual machining can be compared directly. Thus, a determination about power fluctuation can be made quickly.

In accordance with the present invention, the machining power extracting device comprises a cyclic noise removing circuit for removing cyclic noise components from the consumed power, a smoothing circuit for smoothing the output values of the cyclic noise removing circuit, a no-load power extracting circuit for extracting no-load power from the output values of the cyclic noise removing circuit and the smoothing circuit, and machining power computing circuits for subtracting the output of the no-load power extracting circuit from the output values of the cyclic noise removing circuit and the smoothing circuit, the respective machining power computing circuits being connected with the integration device and the maximum value detecting device and being selectively connectable with the input of the judging device.

The consumed power of the driving motor in a cutting machine contains cyclic and non-cyclic noise components resulting from vibrations. These noise components can increase no-load power value and thus cause malfunction.

According to this invention, after removing cyclic noise components from the consumed power, noncyclic noise is removed by smoothing in the smoothing circuit. Thus, power fluctuation can be detected stably.

The thus smoothed machining power is introduced into the control circuit. With this arrangement, since noise-free power values with little fluctuation can be compared and determined, wear of the tool can be detected accurately.

Also, by introducing signals having cyclic noise components removed directly into the judging device, the power values can be compared without time lag. Thus, overload detection and the like can be carried out with high accuracy.

BRIEF DESCRIPTION OF THE DRAWINGS

Other features and objects of the present invention will become apparent from the following description taken with reference to the accompanying drawings, in which.

DESCRIPTION OF THE PREFERRED EMBODIMENT

Now the embodiments of this invention will be described with reference to the accompanying drawings.

Figures 1, 1A:
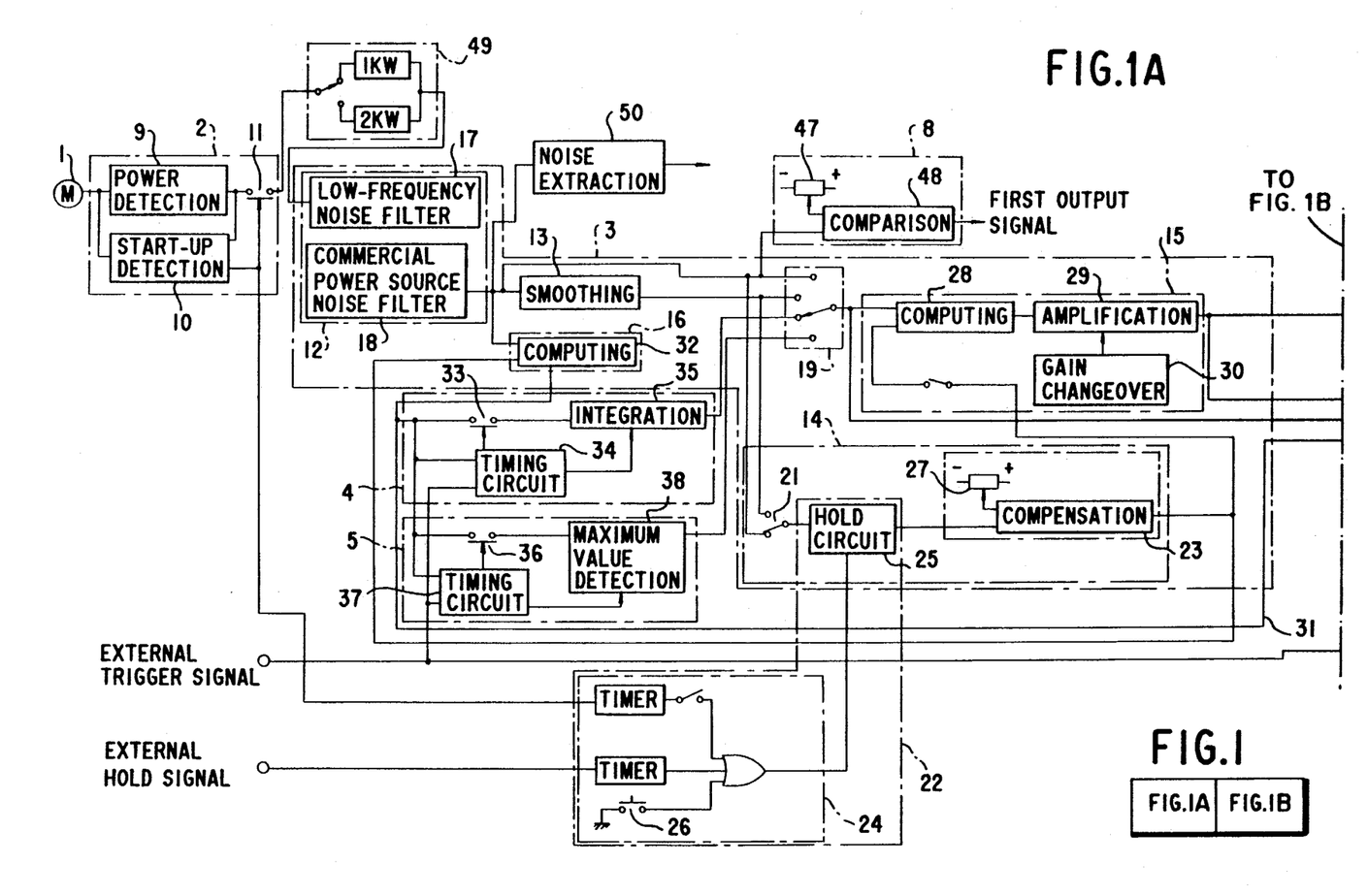
FIGS. 1A and 1B are block diagrams of the controller embodying the present invention.
Figure 1B:
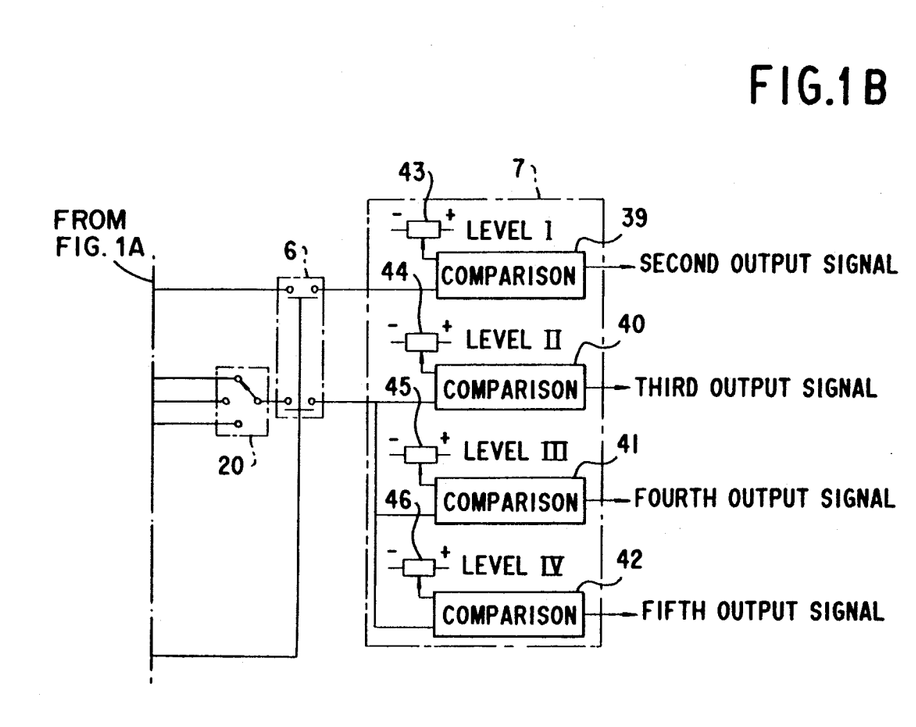

As shown in FIG. 1, the controller according to the present invention comprises seven parts, i.e. a power detecting unit 2 connected to a motor 1 for driving a cutting machine, machining power extracting circuit 3, an integration circuit 4, a maximum value detecting circuit 5, a gate circuit 6, a judgement circuit 7 and an abnormal overload detecting circuit 8.

The driving motor 1 is a motor used for cutting and may be a motor for rotating a spindle or a motor for driving a feed shaft.

The power detecting unit 2 serves to detect and output the power consumed by the driving motor 1. It comprises a power detector 9 for detecting a power value from the voltage and current supplied to the motor, a start-up detecting circuit 10 for detecting the start-up of the motor, a gate circuit 11 for opening and closing the circuits, and a gain changeover unit 49.

The start-up detecting circuit 10 serves to eliminate the power fluctuation at start-up from the measurement range. It has a built-in changeover switch for selecting one of three modes, i.e. a mode in which gate signals are produced while the detected value is larger than a predetermined value, a mode in which they are produced during the start-up, and a mode in which they are normally produced.

The gate circuit 11 opens in response to the gate signals, passing signals representative of consumed power P to the machining power extracting circuit 3.

The gain changeover unit 49 serves to change over the rate of amplification according to the magnitude of input power. When the consumed power P exceeds 1 kw, the position is changed over to the side of 2 kw. Thereafter the power value will decrease to half.

The consumed power P detected in the power detecting unit 2 contains not only the machining power f(t) used for machining and the no-load power $f(t_0)$, but also cyclic noise components (a sin $\omega_0$ t, b sin 2 $\omega_1$ t) originating from the vibration of belts and the properties of the motor and non-cyclic noise components $\Delta f$. Thus it is expressed by the formula:

$$P = f(t) + f(t_0) + a \sin \omega_0 t + b \sin 2 \omega_1 t + \Delta f(t).$$

The machining power extracting circuit 3 serves to extract the machining power $f(t_1)$ from the consumed power P detected in the power detecting unit 2. It comprises a cyclic noise removing circuit 12, a smoothing circuit 13, no-load power detecting circuit 14 and two machining power computing circuits 15 and 16.

The cyclic noise removing circuit 12 comprises a low-frequency noise filter 17 for removing low-frequency noise due to vibrations of the belt and pulley of the motor and other mechanical parts, a commercial power source noise filter 18 for removing noise resulting from inbalance of three-phase current due to certain precision of the AC motor. The filter 17 may comprise, as proposed in Examined Japanese Patent Publication 57-57223, a band-pass circuit, a level adjusting circuit, a phase inverting circuit and an adder. By removing any noise from the consumed power, the contact between the cutting tool and the work can be detected accurately without any time lag and thus the fluctuation in machining power can be detected with high accuracy.

The signals from the cyclic noise removing circuit 12 are fed to the noise extracting circuit 50 to pick out only the oscillatory components from the noise. The noise extracting circuit 50 may comprise a high pass filter, a full-wave rectification circuit and an amplifying circuit to take out only the oscillatory components of the noise after amplifying them several tens of times. By adjusting the level of both filters 17 and 18 so that its output indication will be zero, noise can be removed accurately from the consumed power.

As the smoothing circuit 13, a low pass filter circuit is used. It serves to smooth out the waveform signals of the consumed power. This smoothing treatment serves to round off the waveforms of the power signals, thus eliminating non-cyclic noise components, as shown in FIG. 2c.

The output signals of the cyclic noise removing circuit 12 and the smoothing circuit 13 are applied to the no-load power detecting circuit 14 through a changeover switch 21.

The no-load power detecting circuit 14 serves to detect the no-load power which changes moment by moment due to wear and temperature while the spindle is rotating with the motor idling.

The detecting circuit 14 comprises a sample hold circuit 22 for sampling and holding the power value while not loaded, and a compensation circuit 23 for adding a base voltage to the thus detected no-loaded power value to correct it. The sample hold circuit 22 comprises a sampling command circuit 24 for commanding the time for sampling the consumed power, and a hold circuit 25 for holding the sampled value for a predetermined time period. The sampling command circuit 24 has a changeover function for selecting any of three modes, i.e. a mode in which the time is commanded with the gate signal of the start-up detecting circuit 10 as the start-up signal, a mode in which the command is given in response to an external hold signal, and a mode in which it is given through a manual switch 26.

Figure 3:
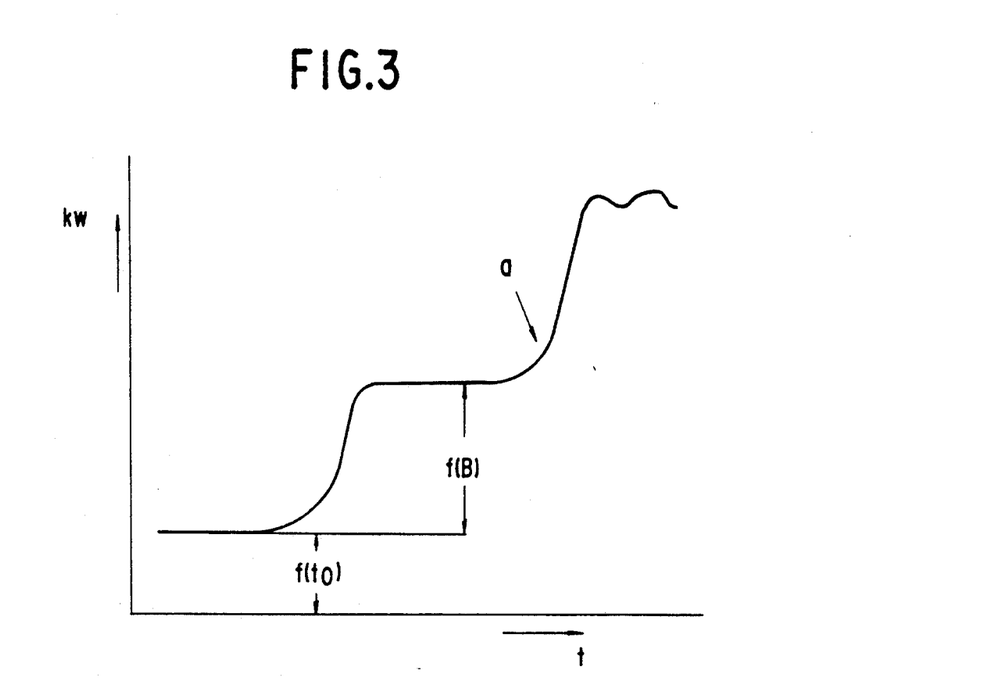
FIG. 3 is a view showing one example of the waveform of the machining power.

On the other hand, the compensation circuit 23 serves to correct a power value as a reference for measurement. It is used e.g. in the following case. When it is necessary to feed the cutting tool further ahead after it has cut into a work, a voltage waveform as shown in FIG. 3 is given. If in such a case it is desired to control accurately the rising portion (a) at the time of feeding, the change in power due to the next feeding can be detected as a power change in normal machining by adding the increase in power f(B) at the time of cutting-in to the power $f(t_0)$ at no-load. The base voltage value, which is the increase in the reference power, can be set with a variable setter 27.

The signals detected by the no-load power detecting circuit 14 are then applied to the first machining power computing circuit 15 and the second machining power computing circuit 16.

The first machining power computing circuit 15 comprises a computing unit 28 for subtracting a no-load power value from the power value input from a first changeover circuit 19, an amplifier 29 for amplifying the output signals from the computing unit 28 to increase the sensitivity of judgement, and a gain changeover unit 30 for changing the rate of amplification by the amplifier 29.

The output signals of the first machining power computing circuit 15 are introduced into the gate circuit 6 connected to the judgement circuit 7 and a second changeover circuit 20.

The second machining power computing circuit 16 comprises a computing unit 32 connected to the cyclic noise removing circuit 12 and the no-load power detecting circuit 14. The computing unit 32 calculates the machining power $f(t_1)$ by subtracting the no-load power value $f(t_0)$ from the consumed power f(t) from which cyclic noise components have been removed.

The output signals of the second machining power computing circuit 16 are applied to the second changeover circuit 20, integration circuit 4 and maximum value detecting circuit 5.

The integration circuit 4 comprises a gate circuit 33 for opening and closing the circuit, a timing circuit 34 for commanding the timing of opening and closing of the gate circuit 33, and an integrator 35.

Into the timing circuit 34 are normally input the machining power signals $f(t_1)$ from the second machining power computing circuit 16 and external trigger signals given in synchronization with the beginning and end of machining. It selects either a signal which indicates that the machining power f(t) has exceeded a reference value set slightly larger than the no-load power $f(t_0)$ or an external trigger signal and outputs a gate timing signal to the gate circuit 33.

Only while it receives a signal from the timing circuit 34, the gate circuit 33 allows the signals representing machining power to pass through the integrator 35.

The integrator 35 carries out integration for the power value which passes through the gate circuit 33. The integrated value $f(t_3) = \int f(t_1)$ is introduced into the first changeover circuit 19.

On the other hand, the maximum value detecting circuit 5 comprises a gate circuit 36, a timing circuit 37 for opening and closing the gate, and a maximum value detector 38. The gate circuit 36 and timing circuit 37 are similar in function to the gate circuit 33 and timing circuit 34 of the integration circuit 4. They pass the signals representing the machining power through the maximum value detector 38 only for a predetermined time period.

Figure 2A:
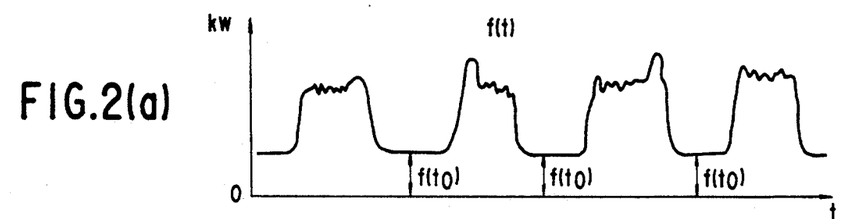
FIGS. 2a, 2b, and 2c are views showing power waveforms given by the controller of FIG. 1.
Figure 2B:
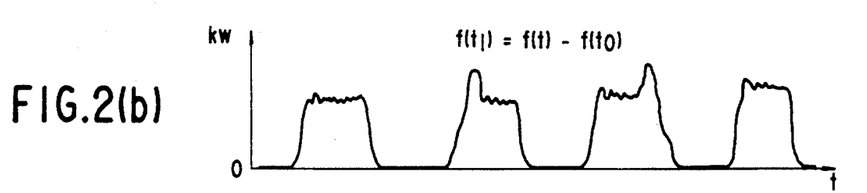
Figure 2C:
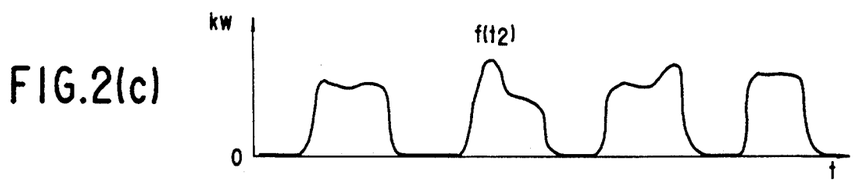
Figure 2D:
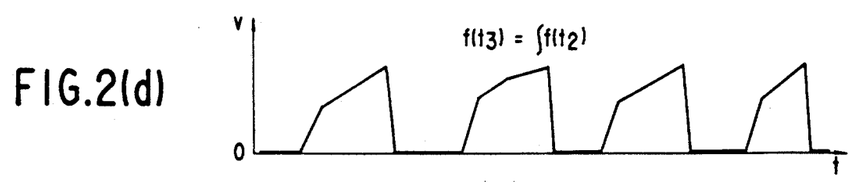
FIGS. 2d and 2e are views showing voltage waveforms of the same.
Figure 2E:
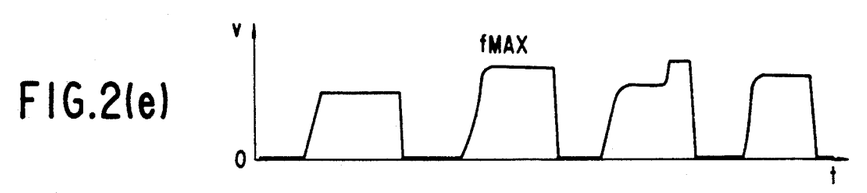

As shown in FIG. 2e, the maximum value detector 38 detects and holds the maximum value $f(t_4) = f(t_1)$ MAX of the power values passing through the gate circuit 36. The maximum value $f(t_4)$ thus detected is introduced into the first changeover circuit 19.

The judgement circuit 7 comprises four comparator circuits 39, 40, 41 and 42. To the respective comparator circuits are connected variable setters 43, 44, 45 and 46 for setting comparative reference values from level I to level IV, respectively.

Among the comparator circuits, the comparator circuit 39 for level I is connected to the machining power extracting circuit 3 through the gate circuit 6 whereas the comparator circuits 40, 41 and 42 for level II to level IV are connected to the second changeover circuit 20 through the gate circuit 6.

Comparative reference value levels I–IV set by the setters 43–46 are given by multiplying the machining powers obtained as a result of trial machining of a sample work by predetermined coefficients. Level I is the maximum reference value for detecting contact between the cutting tool and the work, level II is the maximum reference value for detecting power increase due to breakage of the tool, level III is the maximum reference value for detecting power increase due to wear of the tool, and level IV is the minimum reference value for detecting non-increase in power due to breakage of the tool.

The comparator circuits 39–41 compare the power values input from the gate circuits 6 with the comparative reference value levels I–III, respectively. If the power value exceeds the respective reference value, they give control signals to the cutting machine, commanding changes of cutting conditions or tool exchange.

In contrast, the comparator circuit 42 compares the power value from the gate circuit 6 with the comparative reference value IV and, if the power value does not exceed it, determines that the tool has broken and gives control signals commanding tool exchange. Both level II and level IV have reference values for detection. This is because while any tool breakage during machining can be detected by level II from sharp increase in the power value, if the tool should break at its root immediately after the end of machining, no power rise will occur due to the decrease in length of the tool. Thus, it is necessary to detect the non-increase in power by level IV.

On the other hand, the abnormal overload detecting circuit 8 connected to the cyclic noise removing circuit 12 serves to detect any sharp power increase due to abnormal collision between the cutting tool and the work or improper setting of the tool. This detecting circuit 8 comprises a setter 47 for setting an overload reference value larger than the comparative reference value levels I–IV and a comparator circuit 48 for comparing the overload reference value with the consumed power. The comparator circuit 48 generates a signal for stopping the cutting machine if the consumed power exceeds the overload reference value. The signal from the comparator circuit 48 serves as a first output signal of the controller while the signals from the comparators 39, 40, 41 and 42 of the judgement circuit 7 serve as second to fifth output signals, respectively.

Now the operation of the controller of this embodiment will be described.

The consumed power P of the motor 1 detected by the power detector 9 is fed to the machining power extracting circuit 3 after having their fluctuating portion at start-up cut off by the start-up detecting circuit 10.

When the consumed power passes through the cyclic noise removing circuit 12, its noise components are removed so that a consumed power f(t) having a waveform as shown in FIG. 2a is obtained.

The consumed power is then compared with the overload reference value in the abnormal overload detecting circuit 8. If its maximum value is larger than the overload reference value, the first output signal is output by the detecting circuit 8, stopping the entire function of the cutting machine.

When the consumed power f(t) is not larger than the overload reference value, if the changeover switch 21 is connected with the cyclic noise removing circuit 12 as shown in FIG. 1, the signals of the consumed power f(t) pass through the sample hold circuit 22, so that the no-load power value $f(t_0)$ is extracted. The power value $f(t_0)$ is subtracted from the consumed power f(t) in the computing unit 32 to give the machining power $f(t_1)$ (waveform shown in FIG. 2b).

In this state, by connecting the switch of the first changeover circuit 19 to a terminal of the integration circuit 4 as shown in FIG. 1, either a signal indicating that the machining power $f(t_1)$ has exceeded the reference value or an external trigger signal is selected in the timing circuit 34 of the integration circuit 4 and the gate circuit 33 is opened to feed the signal to the integrator 35.

The integrator 35 integrates the output values of the machining power $f(t_1)$ for the machining time set by the timing circuit 34 and applies them to the first changeover circuit 19. A voltage waveform as shown in FIG. 2d is obtained by this integration.

The integrated value $f(t_3)$ thus obtained is passed through the second changeover circuit 20 and fed to the judgement circuit 7 through the gate circuit 6 which opens synchronized with the gate circuit 33 of the integration circuit 4. In the judgement circuit 7, the integrated value $f(t_3)$ is compared in the comparator circuits 39, 40, 41 and 42 to produce control signals which correspond to the conditions of wear and breakage of the cutting tool. (second to fifth output signals)

In the comparison of the integrated value, since power fluctuations are smoothed out, only the power increase resulting from wear of the tool can be compared accurately. Thus, even if the power changes momentarily during cutting due to chips and foreign matter fused to the cutter edge, accurate comparison of the machining power is possible.

On the other hand, if the switch of the first changeover circuit 19 is connected to a terminal of the maximum value detecting circuit 5, the maximum value $f(t_4)$ of the machining power $f(t_1)$ is detected (FIG. 2e) within the machining time in the maximum value detecting circuit 5. The maximum value $f(t_4)$ is compared and determined in the judgement circuit 7. By using the maximum value $f(t_4)$, accurate response is possible even to momentary power fluctuations in machining in which power fluctuation is violent. Thus, tool breakage can be detected effectively.

If the switch of the first changeover circuit 19 is connected to a terminal leading to the smoothing circuit 13, the consumed power f(t) is smoothed out, so that noncyclic noise is removed. The power value $f(t_2)$ thus given is compared and determined in the judgement circuit 7 after subtracting the no-load power $f(t_0)$ in the first machining power computing circuit 15. In this method which utilizes smoothing signals, there will be time lag in the output signals. But since the power fluctuation can be detected stably, this method is effective in detecting wear of the tool if the nature of machining permits comparatively slow output response.

Further, if the switch of the first changeover circuit 19 is connected to a terminal leading to the cyclic noise removing circuit 12, the machining power can be introduced directly into the judgement circuit 7 without any time lag and compared and determined. This method is effective in machining where quickness in control response is required.

In the above operation, if the changeover switch 21 is switched to the side of the smoothing circuit 13, no-load power can be detected with the smoothed consumed power.

Figure 4:
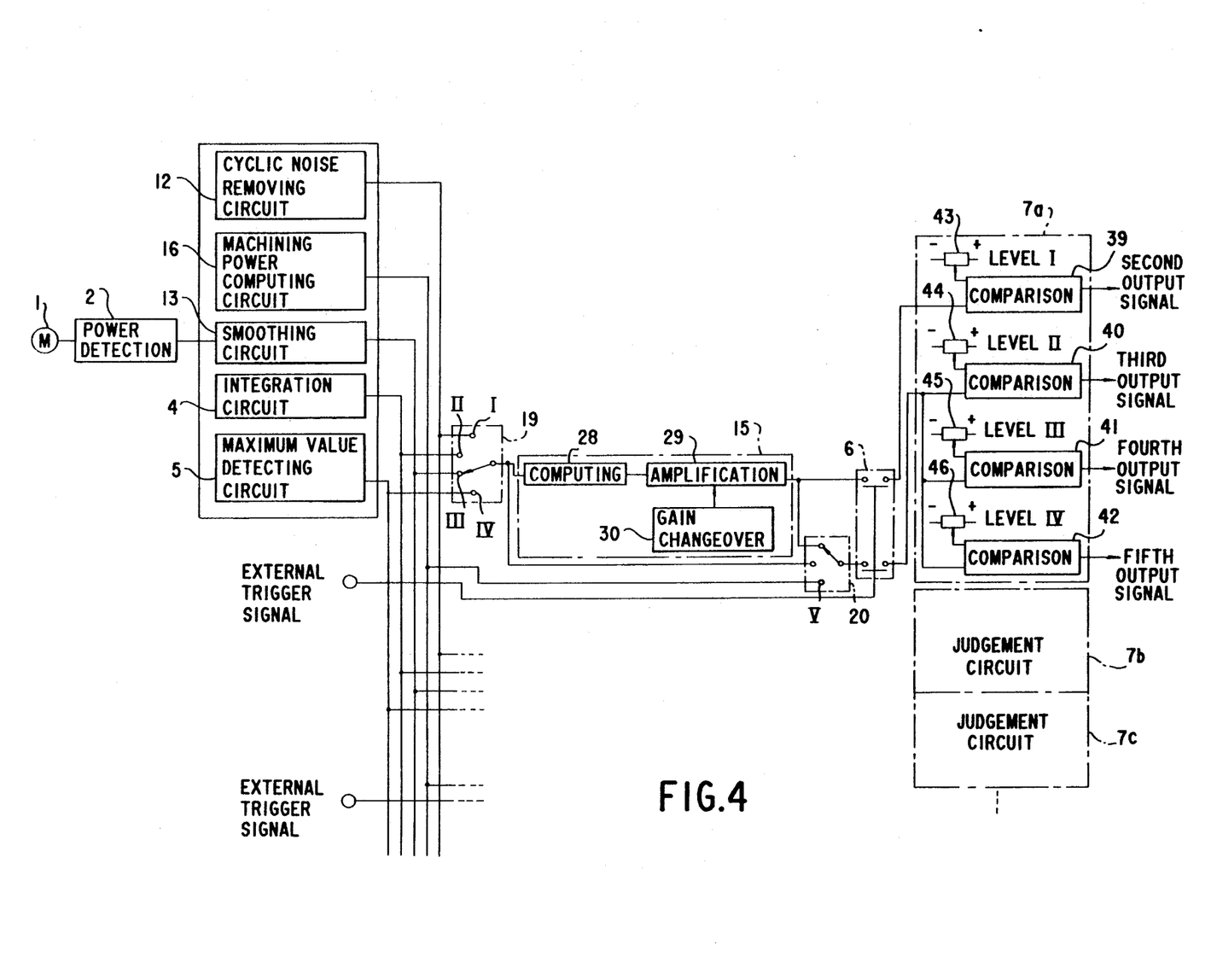
FIG. 4 is a block diagram of another embodiment.

FIG. 4 shows another embodiment.

In this embodiment, as the judgement circuit assembly, there are provided a plurality of judgement circuits 7a, 7b, 7c . . . arranged in parallel to one another and each comprising four comparators 39–42 and four variable setters 43–46. Each of the judgement circuits 7a, 7b . . . has an input which is selectively connectable to a consumed power output terminal (I), smoothed power output terminal (II), integrated value output terminal (III), maximum value output terminal (IV) and machining power output terminal (V) through the first changeover circuit 19 and the second changeover circuit 20.

In the drawing, the cyclic noise removing circuit 12, machining power computing circuit 16, smoothing circuit 13, etc. are shown while omitting other components. But other specific structures are the same as those shown in FIG. 1.

In this embodiment, the output terminals and the judgement circuits are connected together e.g. with one of the judgement circuits 7a connected to the machining power output terminal (V), the next judgement terminal 7b to the integrated value output terminal (III), the next judgement circuit 7c to the maximum value output terminal (IV) and so on. With this arrangement, the machining power, integrated value, maximum value and so on can be compared simultaneously with four comparative reference values. Thus, a plurality of controlled variables extracted from the consumed power during cutting, such as the machining power, integrated value and maximum value can be compared and determined simultaneously. Thus the consumed power, which changes in various ways, can be controlled reliably and efficiently.

The controller may be used in any other way. For example, by setting the comparative reference values for different tools or for different steps in the respective judgement circuits 7a, 7b . . . and having the judgement circuits 7a, 7b . . . actuated one after another according to the tool or the machining step set by external timing signals, comparison can be carried out for a plurality of tools or steps.

What is claimed is:

1. A controller for a cutting machine comprising:
 a machining power extracting means for extracting a machining power related to a machining from consumed power of the cutting machine, said machining power extracting means comprises a cyclic noise removing circuit for removing cyclic noise components from the consumed power, a smoothing circuit for smoothing the output values of said cyclic noise removing circuit, a no-load power extracting circuit for extracting no-load power from the output values of said cyclic noise removing circuit and said smoothing circuit, and machining power computing circuits for subtracting the output of said no-load power extracting circuit from the output values of said cyclic noise removing circuit and said smoothing circuit;

a detection range setting means, connected to said machine power extracting means, for setting a detection range for the machining power thus extracted;

an integration means, connected to said machining power extracting unit, for integrating the output value of said machining power extracting means within the detection range thus set;

a maximum value detecting means, connected to said machine power extracting means, for detecting the maximum value of the output values of said machining power extracting means within said detection range; and a judging means for comparing an input signal with a variable comparative reference value and producing a control signal if said input signal exceeds said comparative reference value, said judging means having an input which is selectively connectable to said machining power extracting means, integration means and maximum value detecting means.

2. A controller for a cutting machine as claimed in claim 1, wherein said respective machining power computing circuits being connected with said integration means and said maximum value detecting means and being selectively connectable with the input of said judging means.

3. A controller for a cutting machine as claimed in claim 1 or 2, wherein said detection range setting means has a gate circuit adapted to open and close with external signals.

4. A controller for a cutting machine as claimed in claim 3, wherein said judging means has a plurality of inputs, each of which has a comparison unit for comparing said input signals and said comparative reference values, and an output for outputting said control signals.

5. A controller for a cutting machine as claimed in any of claims 1 or 2, wherein said judging means has a plurality of inputs, each of which has a comparison unit for comparing said input signals and said comparative reference values, and an output for outputting said control signals.

* * * * *